United States Patent
Gunda et al.

(10) Patent No.: US 7,664,991 B1
(45) Date of Patent: Feb. 16, 2010

(54) SYSTEM AND METHOD FOR DISTRIBUTED FILE SYSTEM I/O RECOVERY

(75) Inventors: Laxmikant Gunda, Pune (IN); Balaji Narasimhan, Los Altos, CA (US); Sara Abraham, Sunnyvale, CA (US); Shie-rei Huang, Saratoga, CA (US); Nagaraj Shyam, San Jose, CA (US)

(73) Assignee: Symantec Operating Corporation, Mountain View, CA (US)

( * ) Notice: Subject to any disclaimer, the term of this patent is extended or adjusted under 35 U.S.C. 154(b) by 1362 days.

(21) Appl. No.: 10/321,120

(22) Filed: Dec. 17, 2002

(51) Int. Cl.
*G06F 11/00* (2006.01)
(52) U.S. Cl. .......................... 714/43; 714/56
(58) Field of Classification Search .............. 714/4, 714/1, 43, 44, 56
See application file for complete search history.

(56) References Cited

U.S. PATENT DOCUMENTS

| | | | |
|---|---|---|---|
| 5,566,297 A | 10/1996 | Devarakonda et al. | |
| 5,815,647 A * | 9/1998 | Buckland et al. | 714/3 |
| 5,978,565 A | 11/1999 | Ohran et al. | |
| 5,987,621 A * | 11/1999 | Duso et al. | 714/4 |
| 6,185,695 B1 * | 2/2001 | Murphy et al. | 714/4 |
| 6,246,666 B1 * | 6/2001 | Purcell et al. | 370/221 |
| 6,633,919 B1 * | 10/2003 | Marcotte | 709/237 |
| 7,143,288 B2 * | 11/2006 | Pham et al. | 713/165 |
| 2002/0174160 A1 * | 11/2002 | Gatto et al. | 709/1 |
| 2004/0093506 A1 * | 5/2004 | Grawrock et al. | 713/189 |
| 2005/0223014 A1 * | 10/2005 | Sharma et al. | 707/10 |

OTHER PUBLICATIONS

Frank Naude, Oracle Real Application SErver/Prarllel Servel FAQ, May 2001.*
Lomet et al., "Efficient Transparent Application Recovery In Client—Server Information Systems," Microsoft Research, 1998 ACM 0-089791-955-5/98/006, 1998, (pp. 460-471).

* cited by examiner

*Primary Examiner*—Scott Baderman
*Assistant Examiner*—Paul F Contino
(74) *Attorney, Agent, or Firm*—Robert C. Kowert; Meyertons, Hood, Kivlin, Kowert & Goetzel, P.C.

(57) ABSTRACT

Embodiments of a system and method for distributed file system I/O recovery in storage networks. Embodiments may detect loss of access to a server in the storage network and recover application I/O requests in real-time once access to the server is restored. Embodiments may detect server and/or network failures and store failed and new I/O requests. Recovery from the failure (e.g. network reconnect, server node reboot, or failover, if this is a clustered environment) may be detected and, after recovery is detected, any stored failed and new I/O requests may be sent to the server. In one embodiment, to detect recovery from the failure, a failed I/O request may be repeatedly re-issued until the I/O request succeeds. Embodiments may be implemented in a variety of storage environments, including environments where clients issue direct I/O over a storage network to storage and control I/O over a network to a server.

25 Claims, 8 Drawing Sheets

SYSTEM AND METHOD FOR DISTRIBUTED FILE SYSTEM I/O RECOVERY

BACKGROUND OF THE INVENTION

1. Field of the Invention

This invention is related to the field of distributed file systems and, more particularly, to software used in recovering from failures in distributed file systems.

2. Description of the Related Art

There is an emerging trend in the Enterprise Storage industry for application servers to use file servers over a network. In these storage networks, applications access files on a file server over a network using a distributed file system protocol. Examples of such protocols are the Common Internet File System (CIFS) and the Network File System (NFS).

FIG. 1 illustrates an exemplary prior art storage environment with a single server. In this environment, client node 106 is coupled to a server node 102 via network 110. Client node 106 may be an application server. Network 110 may be, for example, an enterprise LAN or WAN. Application 108 on client node 106 may access files on storage 104 via server node 102. Server node 102 is coupled to storage 104 via storage network 100. Storage network 100 may be, for example, a Storage Area Network (SAN), although other network models may be used. In this example, server node 102 is a single point of failure. If server node 102 fails, application 108 cannot reach its files on storage 104. To overcome this, some enterprises may implement a clustered file server environment, where two or more servers are used to provide failover in the case of a file server failure. FIG. 2 illustrates an exemplary prior art storage environment with a cluster of three server nodes 102A, 102B, and 102C. If application 108 on client node 106 is accessing files on storage 104 via server node 102A, and server node 102A fails, application 108 on may failover to either server node 102B or 102C.

Some applications such as databases cannot tolerate I/O failures. In case of a file server failure, an application receives I/O failures for any file access. In case of a network connection failure, after the connection timeout the application receives a failure. If the file server fails to respond to any I/O requests (e.g. if there is a file server or network problem), the application may fail. To provide failover in the case of file server failure, the file server may be configured in a clustered environment. Even in a clustered environment, during the failover period of the file server, applications performing I/O operations may fail. In case of I/O failures, these applications may have to be re-instantiated and a recovery may need to be performed once the connection is established. This might be a costly and a time consuming operation. The separation of I/O and control paths made possible by storage networks has created a new manifestation of the problem.

Thus, it is desirable to provide a mechanism in storage networks for recovering failed I/O requests transparently, before the failed I/O requests reach the applications, to prevent the applications from failure, and to prevent any new I/O requests from failing. It is also desirable for this mechanism to be applicable in a variety of storage environments, including storage environments where applications on client nodes (e.g. application servers) issue direct I/O over a storage network such as a SAN to disks and control path I/O requests over a network to the file server.

The storage area network (SAN) model places storage on its own dedicated network, removing data storage from both the server-to-disk SCSI bus and the main user network. This dedicated network most commonly uses Fibre Channel technology, a versatile, high-speed transport. The SAN includes one or more hosts that provide a point of interface with LAN users, as well as (in the case of large SANs) one or more fabric switches, SAN hubs and other devices to accommodate a large number of storage devices. The hardware (e.g. fabric switches, hubs, bridges, routers, cables, etc.) that connects workstations and servers to storage devices in a SAN is referred to as a "fabric." The SAN fabric may enable server-to-storage device connectivity through Fibre Channel switching technology to a wide range of servers and storage devices.

SUMMARY OF THE INVENTION

Embodiments of a system and method for distributed file system I/O recovery in storage networks are described. In storage networks, application(s), including enterprise applications such as Oracle, may access files on a file server over a network using a distributed file system protocol such as NFS and CIFS. Some applications such as databases may not tolerate I/O failures. Embodiments of the I/O recovery mechanism may recover the application I/O requests in real-time once the connection to the file server is re-established. Embodiments may recover failed I/O requests transparently to the application(s), before the failed I/O requests reach the application(s), to prevent the application(s) from failure, and may prevent any new I/O requests from failing. Thus, the application(s) may not have to be re-instantiated and may not need to perform any recovery. Embodiments may help network storage meet the enterprise requirements of robustness by making recoverability practical while requiring no changes to the application code or the server implementations.

Embodiments of the I/O recovery mechanism may be implemented in a variety of storage environments, including, but not limited to, storage environments where client nodes issue direct I/O over a storage network such as a SAN to disks and control path I/O requests over a network to the file server. Embodiments may be used in stateful and stateless distributed file systems. Embodiments may be used in single-server and clustered server environments. In one embodiment, the I/O recovery mechanism may be implemented as a filter driver over the file system client on the client node.

In one embodiment, a client node in a storage environment may include an application and an implementation of the I/O recovery mechanism. The I/O recovery mechanism may detect server node and/or network failures. After detection, the I/O recovery mechanism may store failed and new I/O requests from the application to the server node, and may prevent failed I/O requests from reaching the application. In one embodiment, storing the I/O request may include storing the I/O requests in one or more queues in memory. The I/O recovery mechanism may attempt to detect recovery from the failure (e.g. network reconnect, server node reboot, or failover, if this is a clustered environment) and, if recovery is detected, perform recovery of stored I/O requests. In one embodiment, to detect recovery from the failure, the I/O recovery mechanism may repeatedly re-issue a failed I/O request until the I/O request succeeds. In one embodiment, to recover stored I/O requests after detecting recovery from the failure, the I/O recovery mechanism may send any stored failed and new I/O requests to the server node. Thus, the I/O recovery mechanism may prevent the application from failing in the case of server node failures and/or network disconnects.

BRIEF DESCRIPTION OF THE DRAWINGS

The following detailed description makes reference to the accompanying drawings, which are now briefly described.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of a system and method for distributed file system I/O recovery in storage networks are described. In storage networks, application(s), including enterprise applications such as Oracle, may access files on a file server over a network using a distributed file system protocol such as NFS and CIFS. Some applications such as databases may not tolerate I/O failures. Embodiments of the I/O recovery mechanism may recover the application I/O requests in realtime once the connection to the file server is re-established. Embodiments may recover failed I/O requests transparently to the application(s), before the failed I/O requests reach the application(s), to prevent the application(s) from failure, and may prevent any new I/O requests from failing. Thus, the application(s) may not have to be re-instantiated and may not need to perform any recovery. Embodiments may help network storage meet the enterprise requirements of robustness by making recoverability practical while requiring no changes to the application code or the server implementations.

Embodiments of the I/O recovery mechanism may be implemented in a variety of storage environments, including, but not limited to, storage environments where application servers (also referred to as client nodes) issue direct I/O over a storage network such as a SAN to disks and control path I/O requests over a network to the file server. Embodiments may be used in stateful and stateless distributed file systems. In one embodiment, the I/O recovery mechanism may be implemented as a filter driver over the file system client on the client node. For simplicity, the file system client module on the client node may be referred to herein as the client, and the file system server module on the server node may be referred to herein as the server.

Figure 1:
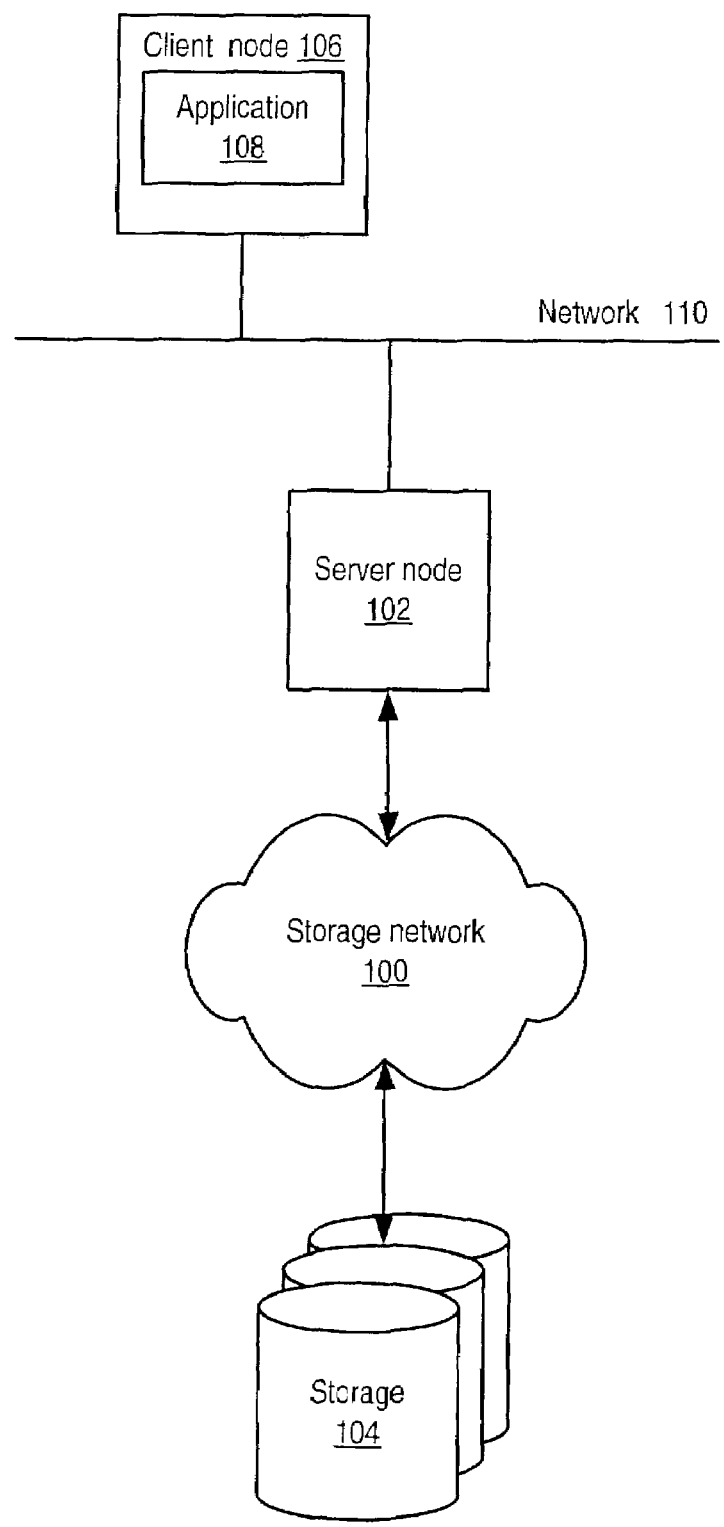
FIG. 1 illustrates an exemplary prior art storage environment with a single server.
Figure 2:
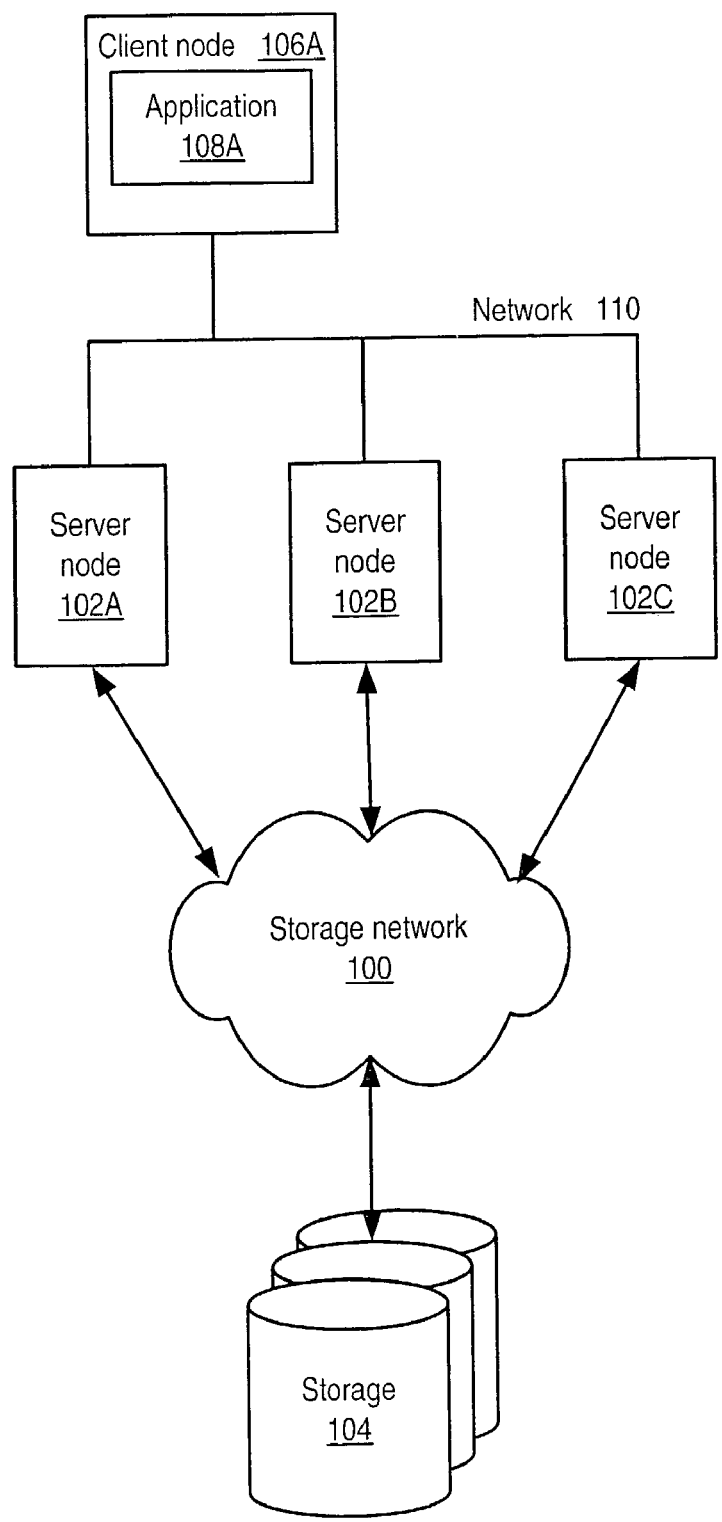
FIG. 2 illustrates an exemplary prior art storage environment with a cluster of servers.
Figure 3:
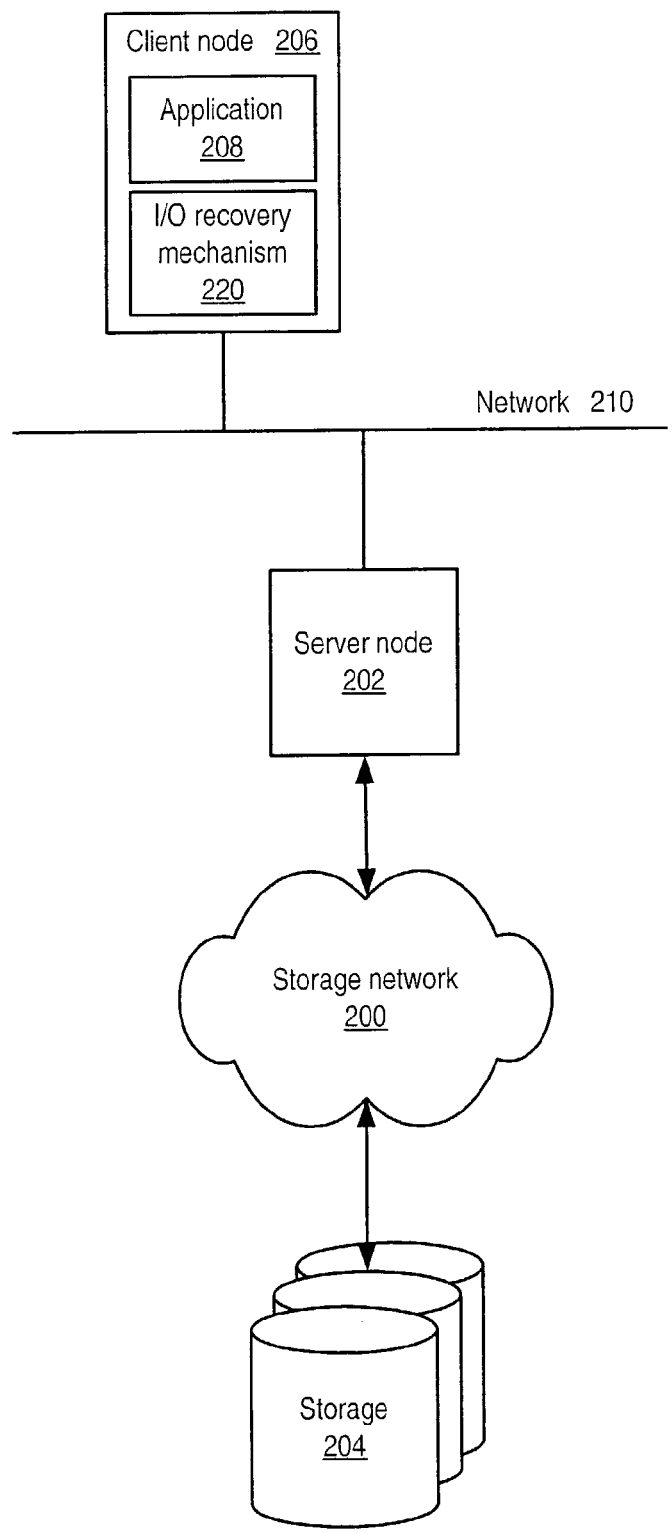
FIG. 3 illustrates an exemplary single-server storage environment with a client node implementing an I/O recovery mechanism according to one embodiment.

FIG. 3 illustrates an exemplary single-server storage environment with a client node implementing an I/O recovery mechanism according to one embodiment. In this example, client node 206 is coupled to a server node 202 via network 210. Client node 206 may be, for example, an application server. Network 210 may be, for example, an enterprise LAN or WAN. Application 208 on client node 206 may access files on storage 204 via server node 202. Application 208 may access files over network 210 using a distributed file system protocol. Examples of such protocols are the Common Internet File System (CIFS) and the Network File System (NFS).

Server node 202 is coupled to storage 204 via storage network 200. Storage network 200 may be, for example, a Storage Area Network (SAN), although other storage network models may be used. Storage 204 may include one or more of, but is not limited to, RAID (Redundant Array of Independent Disks) systems, disk arrays, JBODs (Just a Bunch Of Disks, used to refer to disks that are not configured according to RAID), tape devices, optical storage devices, and combinations thereof. Client node 206 and server node 202 may run any of a variety of operating systems, including, but not limited to: Solaris 2.6, 7, 8, 9, etc.; Linux; AIX; HP-UX 11.0b, 11i, etc.; Microsoft Windows NT 4.0 (Server and Enterprise Server) and Microsoft Windows 2000 (Server, Advanced Server and Datacenter Editions).

Figure 4:
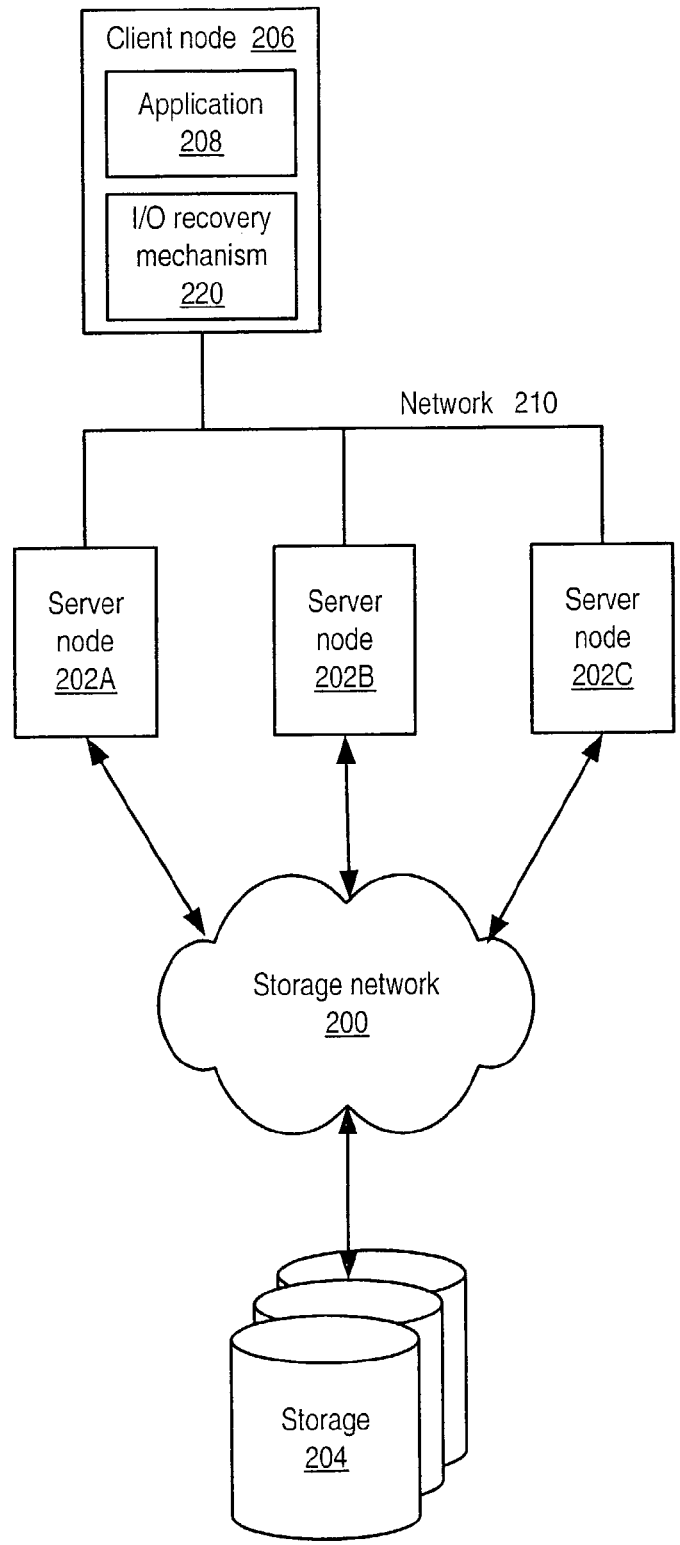
FIG. 4 illustrates an exemplary clustered storage environment with a client node implementing an I/O recovery mechanism according to one embodiment.

FIG. 4 illustrates an exemplary clustered storage environment with a client node implementing an I/O recovery mechanism according to one embodiment. If application 208 is accessing files on storage 204 via server node 202A, and server node 202A fails, application 208 may failover to either server node 202B or 202C.

Figure 5:
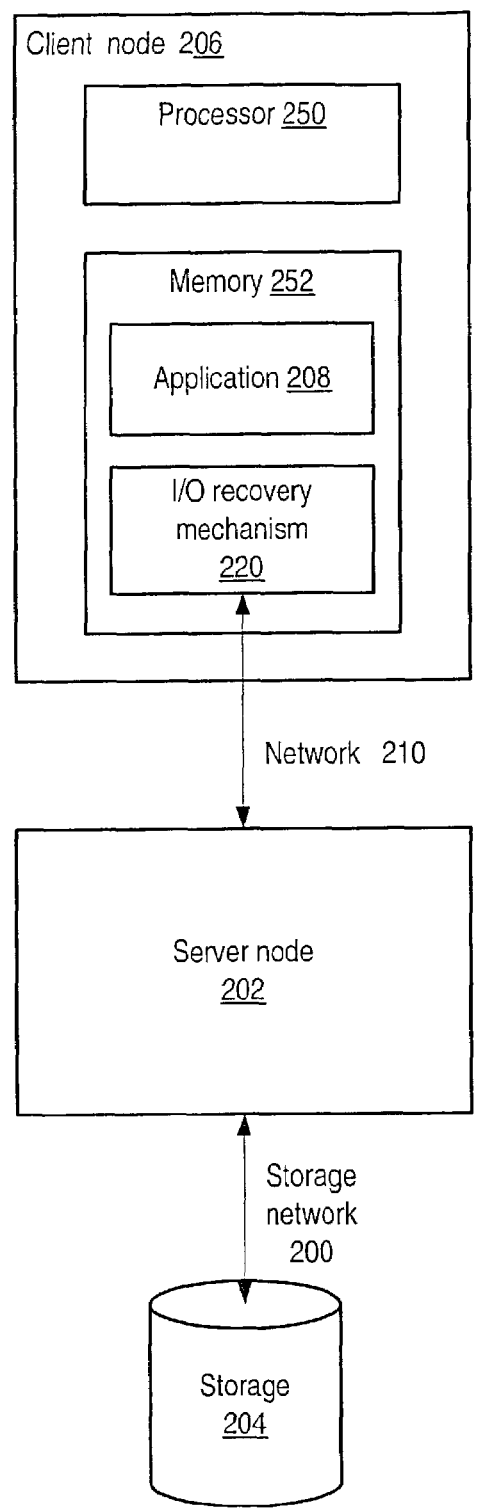
FIG. 5 illustrates a client node implementing an I/O recovery mechanism according to one embodiment.

FIG. 5 illustrates a client node implementing an I/O recovery mechanism according to one embodiment. Client node 206 may be any of the various types of devices, including, but not limited to, a personal computer system, desktop computer, laptop or notebook computer, mainframe computer system, workstation, network appliance, network computer, Internet appliance, or other suitable device. Client node 206 may include at least one processor 250. The processor 250 may be coupled to a memory 252. Memory 252 is representative of various types of possible memory media, also referred to as "computer readable media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof. Client node 206 may couple to server node 202 via network 210. Server node 202 may couple to storage 204 via storage network 200 and may provide access to data (e.g. files) on storage 204 to applications on client node 206, as well as to applications on other client nodes (not shown). FIG. 5 illustrates a single-server configuration. Note that the description of FIG. 5 may also apply to other storage environments, including clustered server configurations.

Client node 206 may include, in memory 252, an application 208 and an I/O recovery mechanism 220. In one embodiment, I/O recovery mechanism 220 may serve as a filter for I/O requests from application 208 and server node 202. I/O recovery mechanism 220 may detect server node 202 and/or network 210 failures. After detection, I/O recovery mechanism 220 may store failed and new I/O requests from application 208 to server node 202, and may also prevent failed I/O results from reaching application 208. Storing I/O requests may include saving the I/O requests in memory. Memory may include, in this instance, either volatile memory such as DRAM, SRAM, EDO RAM, SDRAM, DDR SDRAM, Rambus RAM, etc., a non-volatile memory such as a magnetic media, e.g., a hard drive or optical storage, or a combination thereof. In one embodiment, storing the I/O request may include storing the I/O requests in one or more queues in memory. I/O recovery mechanism 220 may attempt to detect recovery from the failure (e.g. network reconnect or server node 202 reboot or failover, if this is a clustered environment) and, if recovery is detected, perform recovery of stored I/O requests. In one embodiment, to detect recovery from the failure, I/O recovery mechanism 220 may repeatedly re-issue a failed I/O request (in one embodiment, the first failed I/O request), until the I/O request succeeds. In one embodiment, repeatedly re-issuing the failed I/O request may include re-issuing the failed I/O request one or more times. In one embodiment, I/O recovery mechanism 220 may repeatedly re-issue the failed I/O request until the I/O request succeeds or a time limit on re-issues, or alternatively a limit on the number of re-issues, has been reached. In one embodiment, to recover stored I/O requests after detecting recovery from the failure, I/O recovery mechanism 220 may send any stored failed I/O requests in the order the I/O was received from the application and the new I/O requests to server node 202. Thus, I/O recovery mechanism 220 may prevent application 220 from failing in the case of server node 202 failures and/or network 210 disconnects.

The following relates to both single-server storage environments and clustered storage environments, as well as to other storage environments including storage environments that implement a direct access file system. If the server node 202 through which application 208 is accessing storage 204 crashes, then the state(s) maintained by the server node 202 (if this is a stateful distributed file system) are lost. If the server node 202 times out as a result of a network 210 connection failure, then the server node 202 cleans up the state(s) (if any). In either case, the client node 206 receives a network failure or connection timeout error and fails all subsequent I/O requests to the server node 202. If there is a failure, whether the failure is a network connection failure or a server node 202 failure needs to be identified and detected. Embodiments may provide means for detecting loss of access from an application 208 on client node 206 to a server node 202. One embodiment may rely on a heartbeat mechanism and network 210 timeout for the detection. Other embodiments may use other mechanisms to detect and identify failure type.

Embodiments may provide means for recovering failed I/O requests and I/O requests issued from the application 208 to the server node 202 after detecting recovery of access to the server node 202. In one embodiment, to recover I/O requests that fail, the failed I/O requests may be held by the I/O recovery mechanism 220 and are thus not passed to the application 208. In one embodiment, the failed I/O requests may be stored by the I/O recovery mechanism 220 in a failed I/O request queue. If an I/O request is a blocking I/O request, the application 208 is still blocking on the I/O request. The client node 202 may still have the state (if any). In one embodiment, once the I/O recovery mechanism 220 is aware of a network 210 connection failure, any new I/O requests that are received may be maintained in a separate new I/O request queue by the I/O recovery mechanism 220.

Embodiments may provide means for detecting recovery of access to the server node 202 via the network 210. In one embodiment, to detect if the connection is re-established, the first I/O request from the failed I/O request queue is picked by the I/O recovery mechanism 220. For this I/O request, the corresponding file is closed to clean up any state with the client node 206 and the server node 202 (if the server node 202 did not fail). In stateless distributed file systems, state cleanup may not be required. In one embodiment, the I/O recovery mechanism 220 may attempt to reopen the file with the same security credentials and parameters that were used in the original open I/O request (these parameters may be saved during the original open I/O request). In one embodiment, if the reopen fails with the same connection error, then the reopen may be retried, for example after a fixed time. In one embodiment, retry of the reopen may be repeated until the reopen succeeds. In one embodiment, retry of the reopen may be repeated until the reopen succeeds or a limit on the number of retries, or alternatively a time limit for retries, has been exceeded.

Once the reopen succeeds, the I/O recovery mechanism 220 has determined that the connection has been re-established. For stateful distributed file systems, a new file state may be generated on the client node 206 and server node 202. The failed I/O request(s) on that file may be issued and, if the I/O request(s) succeed, the application 208 may be notified of the success. Once the connection is reestablished, the I/O requests in the new I/O request queue may be executed. This ensures that new I/O requests do not fail during a network 210 connection failure or, in clustered environments, during a server node 202 failover.

Figure 6:
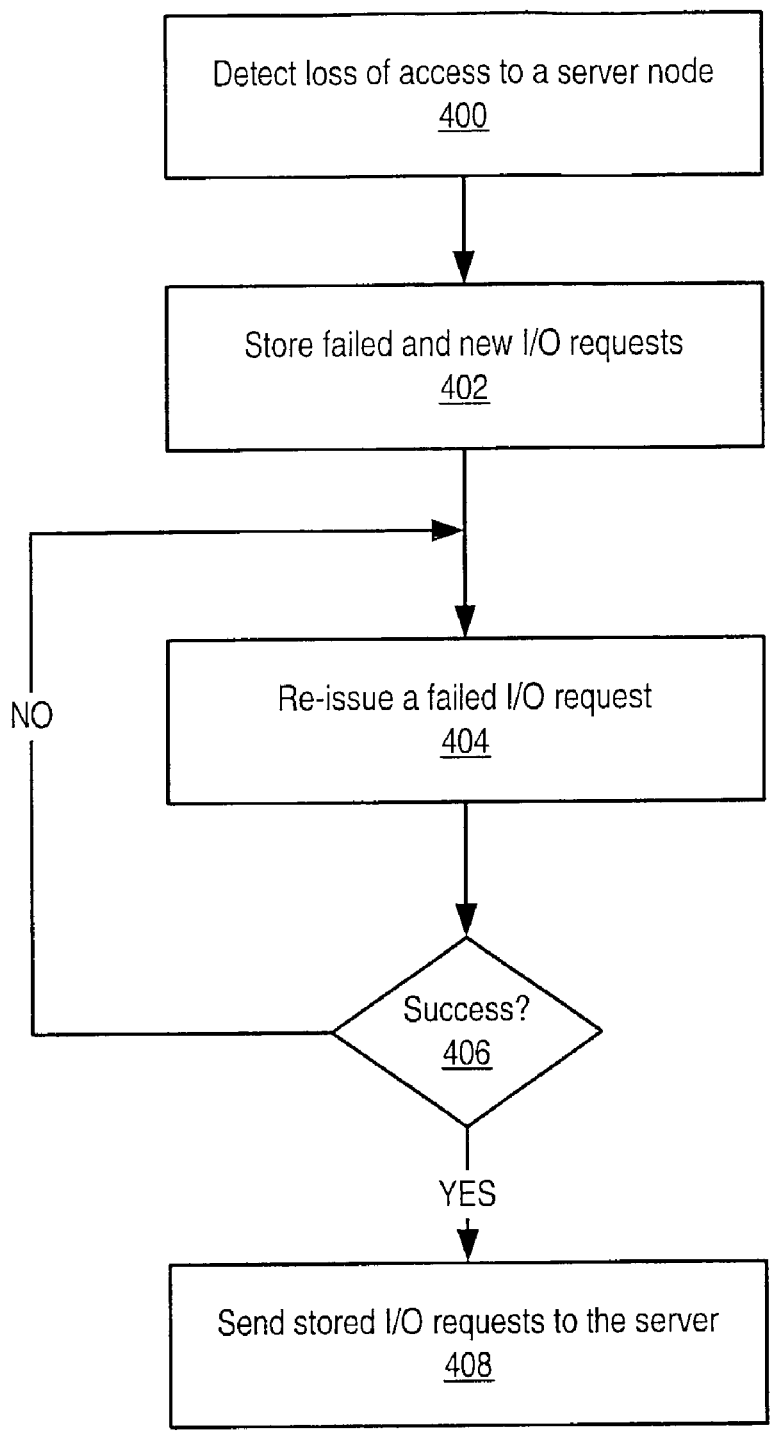
FIG. 6 is a flowchart illustrating a method of I/O recovery in storage networks according to one embodiment.

FIG. 6 is a flowchart illustrating a method of I/O recovery in storage networks according to one embodiment. As indicated at 400, a client node may detect loss of access to a server node. The loss of access may generate one or more failed I/O requests from an application on the client node to the server node. The loss of access may be due to a network connection failure or to a server node failure. As indicated at 402, after detecting loss of access, the failed I/O requests, and any I/O requests issued by the application after the detection, may be stored on the client node. In one embodiment, the I/O requests may be stored in one or more queues. The client node may then attempt to detect recovery of access to the server node or, if this a cluster environment, failover to another server node in the cluster. In one embodiment, to determine when to attempt to detect recovery of access, the client node may maintain a counter for pending I/O requests. This counter may be incremented when an I/O request is issued to the server and decremented when a response is received from the server. If the client receives a failure response, the client queues the failure response and subsequent failed responses, and waits for all the failed responses to arrive, i.e. waits for the counter to become zero. When the counter reaches zero, there are no outstanding responses to be received from the server, and the client may then attempt to detect recovery of access.

To detect recovery of access (or failover to another server node, in cluster environments), the client node may reissue one of the failed I/O requests on the network as indicated at 404. As indicated at 406, if the I/O request is not successful (i.e. fails again), then the client node may repeat re-issuing of the I/O request. If the I/O request is successful, then the client node has detected that the server is again available (e.g. the server node has rebooted or the network connection has been re-established), or if this is a cluster environment, that a failover to another server node has been successfully completed. After detection that the server is again available or that the failover has been completed, the client node may send stored I/O requests to the server node as indicated at 408.

One embodiment of an I/O recovery mechanism may be implemented in direct access file systems that use a direct file access mechanism to provide the ability for an application on a client system to access data directly from storage rather than accessing the data from the server over a network such as a LAN. This provides performance benefits for applications/clients such as Oracle Parallel Server (OPS) that are I/O intensive. OPS and other systems can take advantage of a direct file access mechanism to improve data throughput. An exemplary system is described herein using a direct file access mechanism with an application such as OPS with embodiments of an I/O recovery mechanism in storage networks. It is to be understood that embodiments may be used in other storage network environments than the exemplary environment described herein, including other environments that utilize direct file access in support of other applications and environments that do not utilize direct file access, such as traditional SAN environments.

Figure 7:
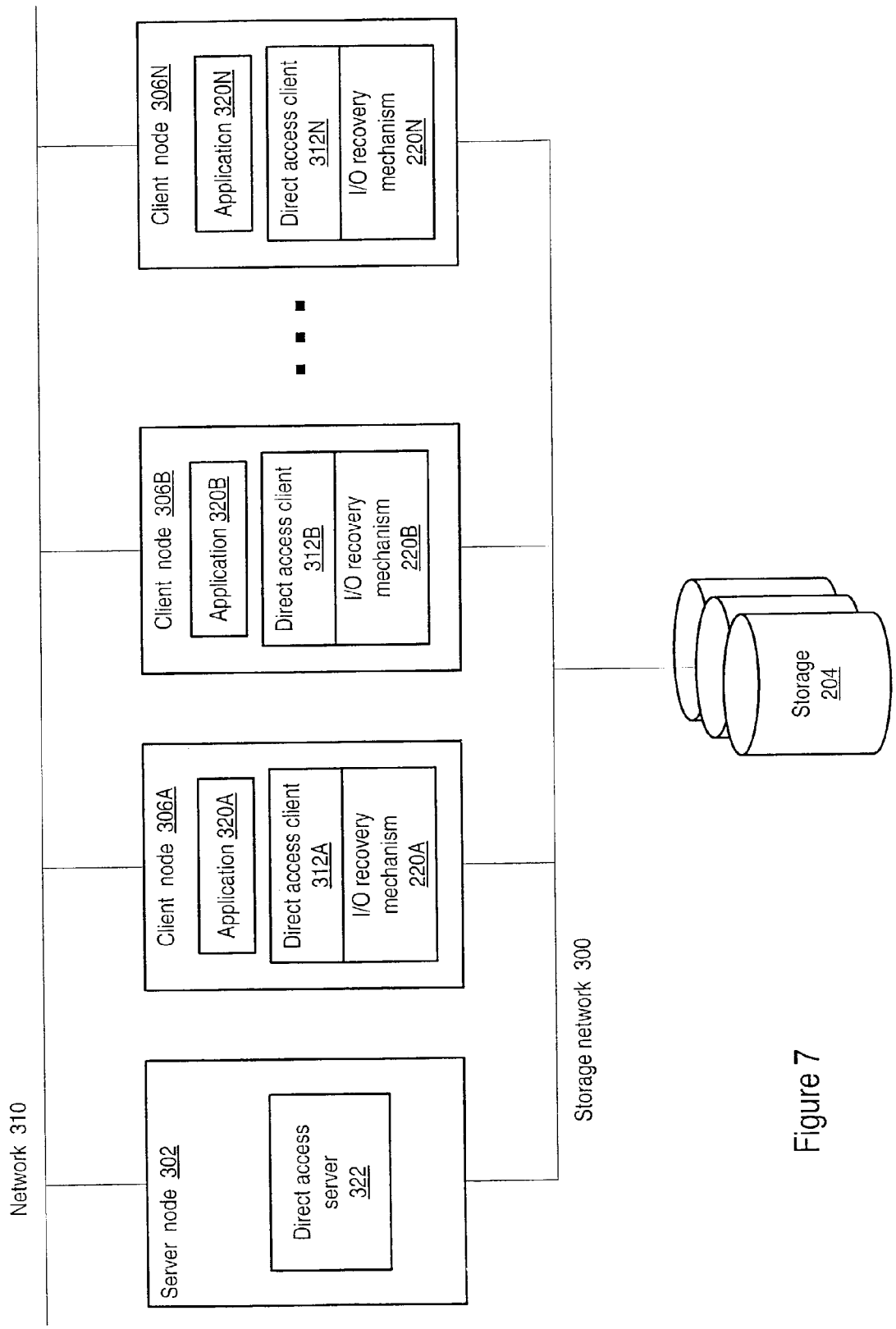
FIG. 7 illustrates a direct access file system according to one embodiment.

FIG. 7 illustrates a direct access file system according to one embodiment. In this example, there are N instances of application 320 (e.g. OPS) running on N direct access client nodes 306. Without a mechanism for real-time I/O recovery, if the direct access server node 302 fails, or if the network connection between the direct access client nodes 306 and the direct access server node 302 goes down, then all N instances of application 320 may have to be restarted, which may take a considerable amount of time. Thus, the direct access server node 302 is a central point of failure. To overcome this, in one embodiment, each instance of direct access client 312 may implement an instance of the I/O recovery mechanism 220. In one embodiment, the I/O recovery mechanism 220 may be integrated with the direct access client 312. In another embodiment, the I/O recovery mechanism 220 may be implemented as a module or driver separate from direct access client 312.

Figure 8:
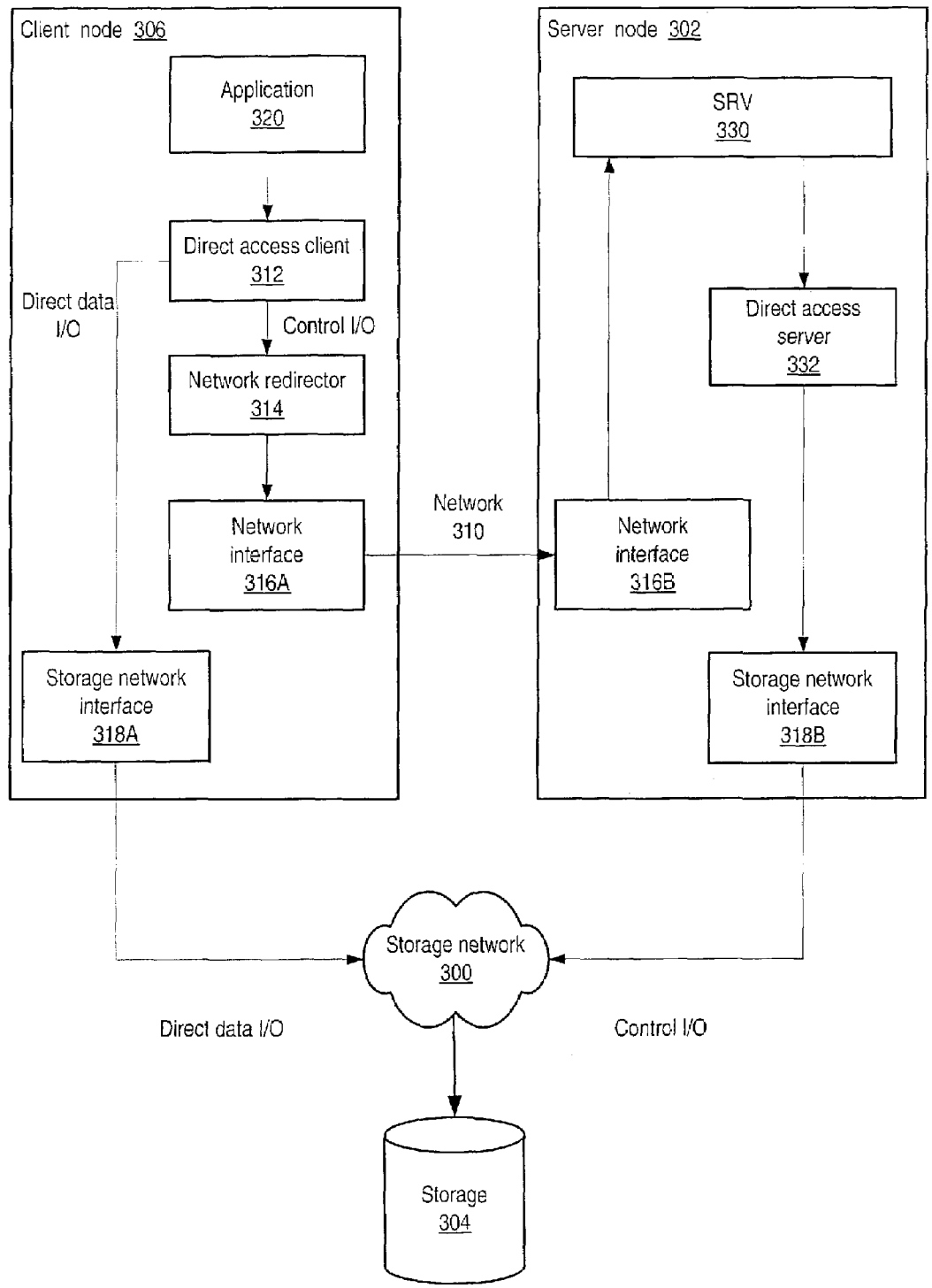
FIG. 8 illustrates a server and client in a direct access file system according to one embodiment.

FIG. 8 illustrates a server and client in a direct access file system according to one embodiment. An application 320 (e.g. the Oracle Parallel Server (OPS) application) may be installed and run on a client node 306 that runs direct file access mechanism client software 312, i.e. the application 320 (e.g. OPS) runs on a direct access file system client node 306 (referred to herein as a direct access client). The database (e.g. Oracle database) resides on shared storage 304. The storage 304 is shared by all application 320 (e.g. OPS) instances running on direct access clients 306. The application 320 (e.g. OPS) issues file I/O to its database, and the direct access file system divides the file I/O into control (metadata) I/O and direct data I/O. The control I/O is redirected to the server node 302 via network 310 through a network redirector 314. In addition, the data I/O is directed to the shared storage 304. The data I/O does not go through the server node 302, thus preferably providing improved I/O performance.

Embodiments of an I/O recovery mechanism may be implemented in direct access to file systems to allow applications (e.g. OPS) running on a direct access client 306 to access storage 304 directly, transparent to server node 302 failures or network 310 failures. This preferably provides high availability to application 320 (e.g. OPS) in the direct access file system environment. Using embodiments, if there is a server node 302 failure or a network 310 connection failure, the application 320 (e.g. OPS) does not receive any I/O errors; instead, the direct access client 306 holds all the I/O requests until the server node 302 comes up or the network 310 connection reestablishes, and then issues the held I/O requests. This is performed transparently to the application 320 (e.g. OPS). In one embodiment, an I/O recovery mechanism on the client node 306 may perform the holding of I/O requests, detection of re-establishment of the network connection to the server, and issuing of the held I/O requests. In one embodiment, the I/O recovery mechanism may be integrated with direct access client 312. In another embodiment, the I/O recovery mechanism may be integrated with network redirector 314. In yet another embodiment, the I/O recovery mechanism may be implemented as a module or driver separate from network redirector 314 and direct access client 312, for example as a driver between direct access client 312 and network interface 316A. For the purpose of this example, the I/O recovery mechanism is considered to be integrated with direct access client 312.

In one embodiment, network redirector 314 may be filtered by direct access client 312 on the client node 306, and may use the CIFS protocol for file operations. Network redirector 314 and CIFS maintain the file, share, connection and session states internally. If network redirector 314 and/or CIFS receives a network failure notification from the network interface 316A, then direct access client 312 may attempt to clean up all the states. After the connection is reestablished, the first request from the client node 306 results in recreation of the connection and file states. A network connection failure or a client/server failure needs to be clearly identified and detected by direct access client 312. In one embodiment, direct access client 312 may rely on network redirector 314 for network 310 failure or server node 302 reboot detection. In one embodiment, direct access client 312 looks for a network redirector 314 return status that represent a connection disconnect or server failure.

In one embodiment, direct access client 312 may need to know the exact time of connection failure or server failure to start the recovery. In addition, the recovery may be dependent on network redirector 314 recovering its file state. The following describes one embodiment of a mechanism for direct access client 312 to detect disconnect from network redirector 314.

For a file I/O request, if network redirector 314 returns a status indicating disconnect, the status indicates a failure of the connection or server. Seeing this status, direct access client 312 may set an internal recovery flag (if the flag is not already set). Direct access client 312 does not return this status to the application 320 (e.g. OPS); instead, direct access client 312 stores the failed I/O request, for example in an internal queue.

In one embodiment, direct access client 312 may need to detect the reestablishment of the network 310 connection or the reconnect to the server node 302. In the case of a network failure, this may include detecting reestablishment of the network 310 connection. In the case of a server node 302 failure, this may include detecting restart/failover of the server node 302. In one embodiment, to determine when to attempt to detect reestablishment of the network 310 connection or the reconnect to the server node 302, direct access client 312 may maintain a counter for pending I/O requests to server node 302. This counter may be incremented when an I/O request is issued to server node 302 and decremented when a response is received from server node 302. If direct access client 312 receives a failure response from server node 302, direct access client 312 queues the failure response and subsequent failed responses and waits for all the failed responses to arrive, i.e. waits for the counter to become zero. When the counter reaches zero, there are no outstanding responses to be received from server node 302, and the direct access client 312 may then attempt to detect reestablishment of the network 310 connection or the reconnect to the server node 302.

In one embodiment, direct access client 312 may detect reestablishment/reconnect using the following method. Other embodiments may use other methods. If direct access client file state needs to be recovered, direct access client 312 cleans up the file state and attempts to generate a new file state by issuing a create request for that file to network redirector 314. Direct access client 312 continues issuing this request until network redirector 314 returns success. In one embodiment, direct access client 312 may sleep for a period between each try. Network redirector 314 returning success indicates that the connection is re-established. Once the connection is re-established, direct access client 312 may regenerate the file state, if necessary. Direct access client 312 then processes any queued I/O requests by re-issuing the requests to network redirector 314. If direct access client 312 file state does not need to be recovered, direct access client 312 may reconnect by issuing the first I/O request in the queue until it succeeds. In one embodiment, direct access client 312 may sleep for a period between each try. Once this request succeeds, direct access client 312 processes the I/O requests in the queue.

The following describes a method to handle direct read/write requests on disconnect and on reconnect according to one embodiment. If direct access client 312 detects a messaging failure, it cannot do direct read/write requests. Direct access client 312 redirects all those requests to network redirector 314. If network redirector 314 returns a failure, then direct access client 312 starts I/O recovery. Direct access client 312 queues all the synchronous direct read/write requests and may put: the application 320 (or one or more threads of application 320) to sleep. For asynchronous direct requests, direct access client 312 returns a pending status to the application 320 (e.g. OPS). For asynchronous direct file read and write requests, direct access client 312 returns a pending status to the application; 320 (e.g. OPS) and the request is queued by the direct access client. On reconnect, direct access client 312 regenerates the file states, if necessary, and starts processing any queued direct read/write requests.

In one embodiment, on the server node 302, CIFS request handler 330 is the server process that handles CIFS requests from clients. CIFS request handler 330 may also maintain a similar set of states as network redirector 314. In case of a network connection failure, CIFS request handler 330 cleans up all the states corresponding to the client node 306 that it maintains. In one embodiment, on the server node 302, CIFS request handler 330 cleans up the file state corresponding to the client node 306, and so from the client viewpoint it may be assumed that a server restart/failover is similar to a network connection failure.

The following describes embodiments of I/O recovery mechanism handling of different types of failure scenarios. While this discussion may in places refer to embodiments of the I/O recovery mechanism in reference to storage networks implementing direct access file systems such as the exemplary storage network illustrated in FIGS. 7 and 8, it is noted that at least some aspects of this discussion may also apply to other storage network environments, including storage networks not using direct access file systems such as the exemplary storage networks illustrated in FIGS. 3 and 4. There are several types of failure scenarios, including server failure, client failure, server and client failure, and network connection failure. If there is a failure, whether the failure is a network connection failure or a client and/or server failure needs to be identified and detected. One embodiment may provide means for detecting loss of access from an application on a client node to a server node coupled to the client node via a network. One embodiment may rely on a heartbeat mechanism and network timeout for the detection. Other embodiments may use other mechanisms to detect and identify failure type.

There may be two types of server failures, which may depend on the type of server environment. Server environments may include clustered and non-clustered server environments. In a clustered environment, a direct access file system server (referred to herein as a direct access server) component may be installed on a server node in the cluster. If the server node with which the direct access client is communicating goes down, the direct access client may identify the failure and wait for failover to another direct access server node in the cluster. Once the new direct access server is ready, the client may issue pending I/O requests to the new direct access server. In addition, the direct access client may recreate the lost state on the direct access server, if this is a stateful system. This state may include one or more of, but is not limited to, be file locks, file offsets etc.

In a non-clustered environment, a direct access file system server component may be installed on the direct access server node. Once the direct access client identifies the direct access server failure, the direct access client waits for the direct access server node to restart, which might take longer than the failover in a clustered server environment. After the direct access server node reboots, the direct access client may recreate the lost state on the direct access server, if this is a stateful system, and issue the pending I/O requests.

As an example, consider a server node to which a direct access client is communicating. If the server node fails, in one embodiment, the failure may be handled similarly by the direct access client whether the server failed in a clustered environment or in a non-clustered environment. In one embodiment, to recover from the server failure, for every open file handle, the direct access client may queue any subsequent data and control I/O requests internally. For asynchronous data I/O operations, an I/O pending status is returned. The direct access client may save the lock state and the open/create parameters for every open/create of a file handle. The lock state may be file/record lock, for example. After the server reboots or fails over, for every file handle, the direct access client may issue a Cleanup and a Close for that file handle to cleanup the old state on the client. The direct access client then may reopens the file using the same handle to create a state on the client and as well as on the server, using the open/create parameters that the direct access client saved. The direct access client then may regenerate the old locking state and the file offset state by issuing appropriate file locking and offset I/O requests, using the lock state that it had saved. The direct access client then issues each I/O request queued internally to the server in the order it was received.

For client failures, the application (e.g. OPS) may perform its own recovery after coming up during client reboot. Since there may not be any previous state with the direct access file system client, the new direct access file system client may come up without worrying about the state. The direct access file system server may need to identify the client failure and may have to cleanup any client-related state that it maintains before the client comes up again.

In the case of both server and client failure, since both the client node (and the application, e.g. OPS) and the server node start up clean, there may not be any previous states. Therefore, in one embodiment, the I/O recovery mechanism may not have to handle this case. The file system and application (e.g. OPS) may recover themselves with the reboot.

For network failure, both the client node and the server node may need to recover the I/O requests after the connection is restored. Therefore, this case is considered both from the client side and the server side. On the client side, a network failure is similar to a server failure, with the difference being that the network connection has failed and not the server. Therefore, the client may determine that the failure is a network failure and not a server failure. The client holds all the I/O requests to the server. After the connection reestablishes, the client starts issuing the held I/O requests. On the server side, the server may not perform any client state cleanup as was described for a client failure. Therefore, the server needs to identify that it is a network failure and not a client failure. In one embodiment, the server may maintain the client state assuming the client will be reconnected. If there are any pending acknowledgements that need to be sent to the client, the server holds them and sends them when the connection reestablishes.

The I/O recovery mechanism queues all I/O requests that it receives for the duration of a failure. If the server takes a very long time to restart or it takes a long time for the network connection to reestablish, then the I/O recovery mechanism may consume system resources like memory, potentially affecting performance on the client node. In one embodiment, if the server has not reconnected before a timeout threshold has been reached, then the I/O recovery mechanism may log the I/O request queue in a log file to local storage to free up system resources. Once the connection reestablishes, the I/O recovery mechanism may read the log file and reissue the pending I/O requests to the server. In one embodiment, the log file may be memory-mapped. In another embodiment, the I/O recovery mechanism may set a threshold on the number of asynchronous I/O requests that can be queued. If the I/O requests reach that threshold, then subsequent I/O requests, if any, may generate errors.

CONCLUSION

Various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   one or more storage devices;
   a file server node coupled to the one or more storage devices via a storage network; and
   an application server node comprising an application and configured to access the server node via a network, wherein the application server node is a client of the file server node, wherein the application is configured to access data on the one or more storage devices by sending I/O requests to the file server node over the network;
   wherein the application server node is configured to:
      detect loss of access to the file server node via the network, wherein said loss generates one or more failed I/O requests from the application to the file server node;
      store failed I/O requests and I/O requests issued from the application to the file server node after detection of the loss of access;
      store security credentials and parameters for the failed I/O requests and the I/O requests issued after detection of the loss of access;
      detect recovery of access to the file server node via the network;
      using the stored security credentials and parameters, reopen files for the failed I/O requests and the I/O requests issued after detection of the loss of access; and
      send the stored I/O requests to the file server node after detection of the recovery and after reopening the files.

2. The system as recited in claim 1, wherein, to detect recovery of access to the file server node via the network, the application server node is further configured to repeatedly send one of the failed I/O requests to the file server node until the failed I/O request succeeds.

3. The system as recited in claim 1, wherein the system is a direct access file system, wherein the application server node is coupled to at least one of the one or more storage devices via the storage network, wherein the application server node is further configured to directly access the data on the one or more storage devices via direct data I/O requests over the storage network, and wherein the I/O requests from the application to the file server node over the network are control I/O requests.

4. The system as recited in claim 3, wherein the application is an Oracle Parallel Server (OPS) application.

5. A system, comprising:
   one or more storage devices;
   a cluster of two or more file server nodes coupled to the one or more storage devices via a storage network; and
   an application server node comprising an application and configured to access the cluster of file server nodes via a network, wherein the application server node is a client of the cluster, wherein the application is configured to access data on the one or more storage devices by sending I/O requests to one of the cluster of file server nodes over the network;
   wherein the application server node is configured to:
      detect failure of the one of the cluster of file server nodes, wherein said failure generates one or more failed I/O requests from the application to the one of the cluster of file server nodes;
      store failed I/O requests and I/O requests issued from the application to the one of the cluster of file server nodes after detection of the failure;
      store security credentials and parameters for the failed I/O requests and the I/O requests issued after detection of the loss of access;
      detect failover to another one of the cluster of file server nodes;

using the stored security credentials and parameters reopen files for the failed I/O requests and the I/O requests issued after detection of the loss of access; and send the stored I/O requests to the other one of the cluster of file server nodes after detection of the failover and after reopening the files.

6. The system as recited in claim 5, wherein, to detect failover to another one of the cluster of file server nodes, the application server node is further configured to repeatedly send one of the failed I/O requests until the failed I/O request succeeds.

7. A system, comprising:
a processor; and
a memory comprising program instructions, wherein the program instructions are executable by the processor to:
detect loss of access to a file server node coupled to the system via a network, wherein said loss generates one or more failed I/O requests from an application of the system to the file server node, wherein the application is configured to access data on one or more storage devices coupled to the file server node via a storage network by sending I/O requests to the server node over the network;
store failed I/O requests and I/O requests issued from the application to the file server node after detection of the loss of access;
store security credentials and parameters for the failed I/O requests and the I/O requests issued after detection of the loss of access;
detect recovery of access to the file server node via the network;
using the stored security credentials and parameters reopen files for the failed I/O requests and the I/O requests issued after detection of the loss of access; and
send the stored I/O requests to the file server node after detection of the recovery and after reopening the files.

8. The system as recited in claim 7, wherein, to detect recovery of access to the file server node via the network, the program instructions are further executable by the processor to repeatedly send one of the failed I/O requests to the file server node until the failed I/O request succeeds.

9. The system as recited in claim 7, wherein the system is an application server that also functions as a client node in a direct access file system, wherein the system is coupled to at least one of the one or more storage devices via the storage network, wherein the system is configured to directly access the data on the one or more storage devices via direct data I/O requests over the storage network, and wherein the I/O requests from the application to the file server node over the network are control I/O requests.

10. The system as recited in claim 9, wherein the application is an Oracle Parallel Server (OPS) application.

11. A system, comprising:
a processor; and
a memory comprising program instructions, wherein the program instructions are executable by the processor to:
detect failure of a file server node coupled to the system via a network, wherein said failure generates one or more failed I/O requests from an application of the system to the file server node, wherein the application is configured to access data on one or more storage devices coupled to the file server node via a storage network by sending I/O requests to the file server node over the network;
store failed I/O requests and I/O requests issued from the application to the file server node after detection of the loss of access;
store security credentials and parameters for the failed I/O requests and the I/O requests issued after detection of the loss of access;
detect failover to another file server node;
using the stored security credentials and parameters reopen files for the failed I/O requests and the I/O requests issued after detection of the loss of access; and
send the stored I/O requests to the other file server node after detection of the failover and after reopening the files.

12. The system as recited in claim 11, wherein, to detect failover to another file server node, the program instructions are further executable by the processor to repeatedly send one of the failed I/O requests until the failed I/O request succeeds.

13. A system, comprising:
means for detecting loss of access from an application on an application server node to a file server node coupled to the application server node via a network, wherein the application server node is a client of the file server node, wherein the application is configured to access data on one or more storage devices coupled to the file server node via a storage network by sending I/O requests to the file server node over the network;
means for storing failed I/O requests and I/O requests issued from the application to the file server node after said detecting recovery of access to file the server node;
means for storing security credentials and parameters for the failed I/O requests and the I/O requests issued after detection of the loss of access;
means for detecting recovery of access to the file server node via the network; and
means for recovering said stored failed I/O requests and said stored I/O requests issued from the application to the file server node after said detecting recovery of access to the server node, wherein said recovering comprises using the stored security credentials and parameters to reopen files for the failed I/O requests and the I/O requests issued after detection of the loss of access; and
means for sending the stored I/O requests to the file server node after the detection of the recovery and after reopening the files.

14. A method, comprising:
an application server node detecting loss of access to a file server node via a network, wherein the application server node is a client of the file server node, wherein said loss generates one or more failed I/O requests from an application on the application server node to the file server node;
wherein the application is configured to access data on one or more storage devices coupled to the file server node via a storage network by sending I/O requests to the file server node over the network;
the application server node storing failed I/O requests and I/O requests issued from the application to the file server node after detection of the loss of access;
the application server node storing security credentials and parameters for the failed I/O requests and the I/O requests issued after detection of the loss of access;
the application server node detecting recovery of access to the file server node via the network;

the application server node using the stored security credentials and parameters to reopen files for the failed I/O requests and the I/O requests issued after detection of the loss of access; and the application server node sending the stored I/O requests to the file server node after detection of the recovery and after reopening the files.

15. The method as recited in claim 14, wherein said detecting recovery of access to the file server node via the network comprises repeatedly sending one of the failed I/O requests to the file server node until the failed I/O request succeeds.

16. The method as recited in claim 14, wherein the application server node and the file server node are in a direct access file system, wherein the application server node is coupled to at least one of the one or more storage devices via the storage network, wherein the application server node is configured to directly access the data on the one or more storage devices via direct data I/O requests over the storage network, and wherein the I/O requests from the application to the file server node over the network are control I/O requests.

17. The method as recited in claim 16, wherein the application is an Oracle Parallel Server (OPS) application.

18. A method, comprising:

an application server node detecting failure of a file server node via a network, wherein the application server node is a client of the file server node, wherein said failure generates one or more failed I/O requests from an application on the application server node to the file server node;

wherein the application is configured to access data on one or more storage devices coupled to the file server node via a storage network by sending I/O requests to the file server node over the network;

the application server node storing failed I/O requests and I/O requests issued from the application to the file server node after detection of the loss of access;

the application server node storing security credentials and parameters for the failed I/O requests and the I/O requests issued after detection of the loss of access;

the application server node detecting failover to another file server node;

the application server node using the stored security credentials and parameters to reopen files for the failed I/O requests and the I/O requests issued after detection of the loss of access; and the application server node sending the stored I/O requests to the other file server node after detection of the failover and after reopening the files.

19. The method as recited in claim 18, wherein said detecting failover to another file server node comprises repeatedly sending one of the failed I/O requests to the file server node until the failed I/O request succeeds.

20. A computer-accessible storage medium comprising program instructions, wherein the program instructions are configured to implement:

an application server node detecting loss of access to a file server node via a network, wherein the application server node is a client of the file server node, wherein said loss generates one or more failed I/O requests from an application on the application server node to the file server node;

wherein the application is configured to access data on one or more storage devices coupled to the file server node via a storage network by sending I/O requests to the file server node over the network;

the application server node storing failed I/O requests and I/O requests issued from the application to the file server node after detection of the loss of access;

the application server node storing security credentials and parameters for the failed I/O requests and the I/O requests issued after detection of the loss of access;

the application server node detecting recovery of access to the file server node via the network;

the application server node using the stored security credentials and parameters to reopen files for the failed I/O requests and the I/O requests issued after detection of the loss of access; and the application server node sending the stored I/O requests to the file server node after detection of the recovery and after reopening the files.

21. The computer-accessible storage medium as recited in claim 20, wherein, in said detecting recovery of access to the file server node via the network, the program instructions are further configured to implement repeatedly sending one of the failed I/O requests to the file server node until the failed I/O request succeeds.

22. The computer-accessible storage medium as recited in claim 20, wherein the application server node and the file server node are in a direct access file system, wherein the application server node is coupled to at least one of the one or more storage devices via the storage network, wherein the application server node is configured to directly access the data on the one or more storage devices via direct data I/O requests over the storage network, and wherein the I/O requests from the application to the file server node over the network are control I/O requests.

23. The computer-accessible storage medium as recited in claim 22, wherein the application is an Oracle Parallel Server (OPS) application.

24. A computer-accessible storage medium comprising program instructions, wherein the program instructions are configured to implement:

an application server node detecting failure of a file server node via a network, wherein the application server node is a client of the file server node, wherein said failure generates one or more failed I/O requests from an application on the application server node to the file server node;

wherein the application is configured to access data on one or more storage devices coupled to the file server node via a storage network by sending I/O requests to the file server node over the network;

the application server node storing failed I/O requests and I/O requests issued from the application to the file server node after detection of the loss of access;

the application server node storing security credentials and parameters for the failed I/O requests and the I/O requests issued after detection of the loss of access;

the application server node detecting failover to another file server node;

the application server node using the stored security credentials and parameters to reopen files for the failed I/O requests and the I/O requests issued after detection of the loss of access; and the application server node sending the stored I/O requests to the other file server node after detection of the failover and after reopening the files.

25. The computer-accessible storage medium as recited in claim 24, wherein, in said detecting failover to another file server node, the program instructions are further configured to implement repeatedly sending one of the failed I/O requests to the file server node until the failed I/O request succeeds.

* * * * *

UNITED STATES PATENT AND TRADEMARK OFFICE
CERTIFICATE OF CORRECTION

PATENT NO. : 7,664,991 B1  
APPLICATION NO. : 10/321120  
DATED : February 16, 2010  
INVENTOR(S) : Gunda et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1027 days.

Signed and Sealed this

Seventh Day of December, 2010

David J. Kappos  
*Director of the United States Patent and Trademark Office*